Jan. 17, 1961  J. D. WILSON  2,968,491
WAREHOUSE PALLET DOLLY
Filed Feb. 26, 1959
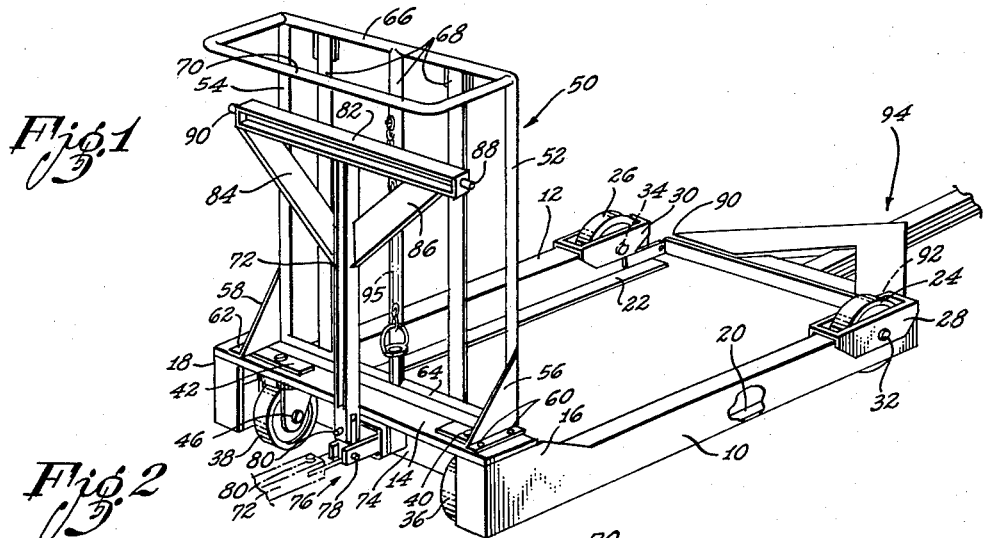
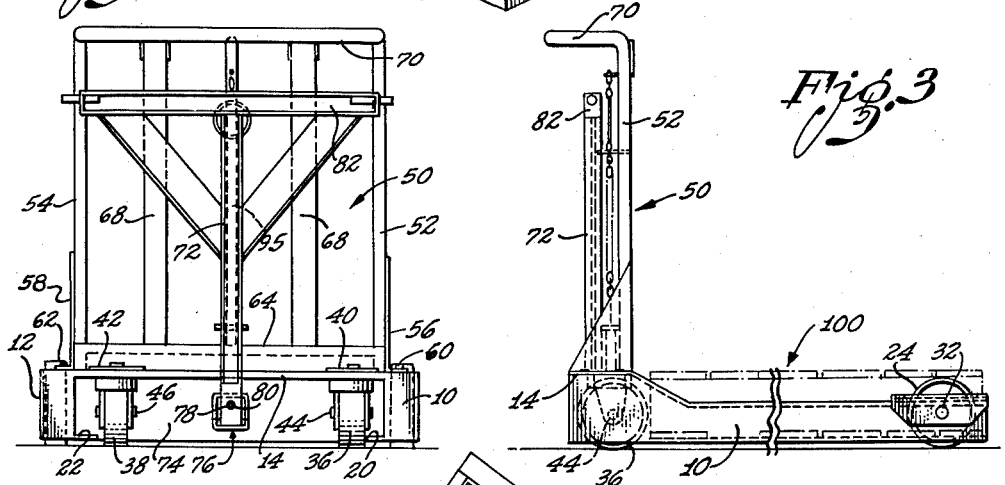
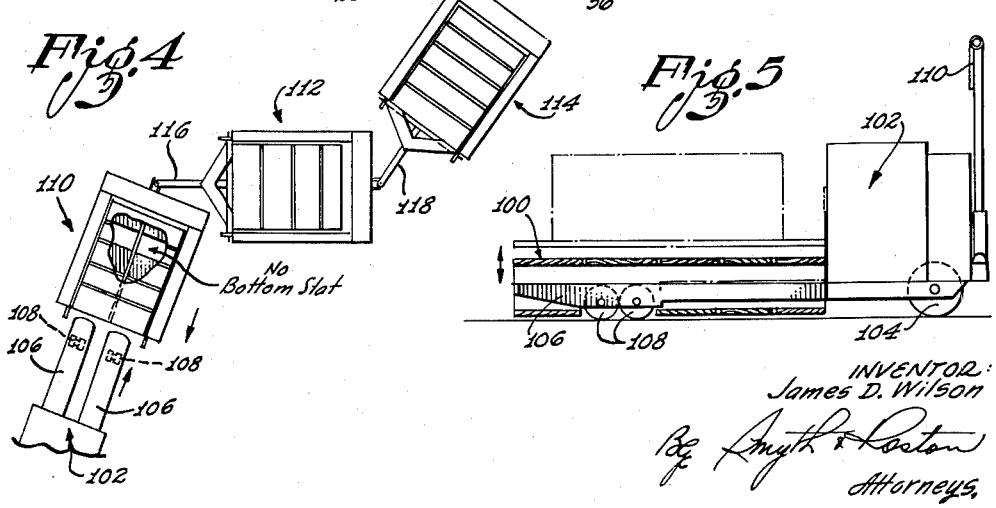
INVENTOR:
James D. Wilson
By Smyth & Roston
Attorneys

United States Patent Office 2,968,491
Patented Jan. 17, 1961

2,968,491

WAREHOUSE PALLET DOLLY

James D. Wilson, Long Beach, Calif., assignor to Banner Metals, Inc., Los Angeles, Calif., a corporation of California Filed Feb. 26, 1959, Ser. No. 795,766

2 Claims. (Cl. 280—47.34)

The present invention relates to wheeled trucks of the type commonly used around warehouses and usually referred to as "dollies." The invention is more particularly concerned with an improved type of dolly for transporting warehouse pallets, and for general use around a grocery warehouse or other types of warehouses.

A warehouse pallet is a portable, double-faced wooden or metal platform, usually about four feet square. The pallet is used for holding material for storage or transportation about the warehouse. The two faces of the pallet are usually formed of wooden slats, and the faces are spaced from one another. The spacing between the faces enables the forks of a hand truck or of a fork lift truck to be inserted into the space, so that the pallet may be transported with its load from one point to another in the warehouse.

It has also proved to be convenient to place the usual warehouse pallet on a dolly and to move the dolly, either alone or in a train, around the warehouse. As the dolly, or train of dollies, are so moved about the warehouse, different items from different points in the warehouse may be loaded on the pallets. The dolly may then be moved to an unloading point at which its loaded pallet may be removed and loaded, for example, in the transport which is to carry it to its final destination.

The prior art dollies for the most part are constructed in such a manner that when they are used for the purpose described in the preceding paragraph, difficulties have been encountered in conveniently unloading the loaded pallets from the prior art dollies at the unloading point. For example, most prior art dollies are constructed so that their wheels are situated directly under the loaded pallets. This factor causes the pallets to be placed in an inaccessible position and to be positioned at a plane too high from the floor to permit the unloading of the pallets by present day simple inexpensive hand trucks. Instead, it has usually been found necessary to use more expensive handling equipment, such as a heavy-duty fork lift truck to remove the loaded pallets from the prior art type of dolly.

An important feature of the present invention is the provision of an improved warehouse dolly which is constructed to carry the pallets in an underslung manner, such that the pallets are positioned in a readily accessible position and down below the tops of the wheels of the dolly and close to the floor. This feature, in addition to other constructional features of the invention which will be described, permit a simple and inexpensive hand pallet truck to be used to unload the pallet from the dolly of the present invention. Such hand pallet trucks, prior to the present invention, were limited in use to lifting pallets from the floor of the warehouse for transportation from one point to another. The extended use of these hand trucks made practical by the dolly of the present invention results, as mentioned above, in a saving in handling equipment since it obviates the need for the more expensive heavy-duty fork lift trucks required by the prior art dollies.

Another advantage which results from the underslung constructional feature of the dolly of the present invention is the fact that, since the pallet carried by the dolly of the invention is lower to the floor than pallets carried by the prior art type of dollies referred to above, more "payload" can be placed on the pallet carried by the dolly of the invention without exceeding the safe load height. This is because the center of graviy of the load carried by the dolly of the invention is lower than the center of gravity of the load carried by the prior art dollies. Therefore, when the load on a pallet carried by the dolly of the present invention is extended up to the safe height, the load on the dolly of the invention is materially greater than a load of the same height on a prior art dolly. In a constructed embodiment of the invention, increased load capacities of over 20%, as compared with prior art dollies, have been exhibited by dollies constructed in accordance with the concepts of the present invention.

In the embodiment of the invention to be described, the dolly includes an upright load guard mounted at one end of the dolly. This load guard may have a rectangular configuration, and it may consist of upright metal strips and bars. An interconnecting transverse top bar for the load guard may be shaped conveniently to form a "push bar" for the dolly. This permits the dolly to be manually pushed around the warehouse for order selecting, for example.

The dolly of the embodiment of the invention to be described is constructed so that its two front wheels are supported for rotation about a rotational axis which is fixed relative to the dolly, and so that the rear two wheels are swivelly supported. This permits the dolly to be easily guided and navigated about the aisles of a warehouse.

The dolly of the embodiment of the invention to be described is also constructed so that a number of similar dollies can be hooked together to form a train. The train of dollies can then be towed by a mechanical tow motor through the aisles of the warehouse. Alternately, the train of dollies can be towed on a conveyor built below the floor level of the warehouse and usually referred to as a "drag line." As the dollies are so towed around the warehouse, the pallets carried on them can be loaded with merchandise selected by a warehouseman walking beside the train.

Then, as mentioned above, the loaded pallets can be removed from the dollies of the present invention at the unloading point by a simple hand truck.

The dolly to be described is provided with an improved hitching means which permits the dolly to be hooked into a train, as described above. This improved hitch allows the dollies in the train to negotiate a sharp turn in the warehouse. The hitch is so designed that when such a sharp turn is negotiated, the dollies trail one directly behind the other, rather than progressively crowding the inside corner.

The improved hitch referred to above is constructed in combination with other features of the dolly so that as one dolly starts to turn, the hitch swings out causing the swivelly mounted wheels on the rear end of the following dolly to swivel and negotiate the turn in approximately the same track as the preceding dolly.

The use of trains of dollies constructed in accordance with the present invention in the manner briefly outlined in the preceding paragraphs permits the warehouse to have narrower aisles with resulting increased usability of valuable warehouse floor space for merchandise. The particular hitch referred to above, and which will be described in greater detail subsequently, is also advantageous in that it permits a train of two or three dollies to be backed up without jackknifing the train, as often occurs with many of the prior art types of dollies.

Further features and advantages of the dolly of the present invention will become apparent when the following specification is considered in conjunction with the accompanying drawing.

In the drawing:

Figure 1 is a perspective view of one embodiment of the invention as taken from the rear of the dolly, this embodiment illustrating particularly the manner in which the wheels of the dolly are supported in the dolly framework, and the manner in which an improved hitch is constructed and pivotally mounted to the rear end of the dolly;

Figure 2 is an end elevational view of the dolly of Figure 1, taken from the rear end of the dolly, this view illustrating particularly the manner in which the rear wheels of the dolly are swivelly mounted on a transverse member;

Figure 3 is a side elevational view of the dolly of Figure 1, this latter view illustrating particularly the manner in which a warehouse pallet is supported on the dolly in an underslung manner and on a pair of supporting flanges which are situated below the axis of rotation of the wheels;

Figure 4 is a top plan view, on a reduced scale, of several dollies each constructed in accordance with the concepts of the present invention and being intercoupled by means of the improved hitches to form a train of dollies; the latter view also illustrating the manner in which the forks of a hand pallet truck may be inserted into a supported pallet and through the open front end of a dolly to conveniently remove the pallet; and Figure 5 is a side view, partly in section, of a typical warehouse pallet resting on the floor of the warehouse, the pallet being of the type which may conveniently be transported by the dolly of the invention; this last view illustrating the manner in which a known type of hand pallet truck may have its forks inserted into the pallet for transporting the pallet from one point to another.

The wheeled dolly truck illustrated in the accompanying drawing includes a first elongated side member 10 and a second elongated side member 12. Each of the side members 10 and 12 in the illustrated embodiment of the invention has a rectangular cross section, and each has a top surface and a lower surface. The side members 10 and 12, and the other components which make up the dolly of the illustrated embodiment of the invention, may conveniently be formed of steel or any other suitable material.

An elongated transverse member 14 is secured, as by welding, to the top surface of the member 10 at the rear end of that member and to the top surface of the member 12 at the rear end of the latter member. As illustrated in Figure 1, for example, the top surfaces of the members 10 and 12 may have raised portions 16 and 18 at their rear ends to which the transverse member 14 is welded. This causes the plane of the transverse member 14 to be raised above the plane of the top surfaces of the remaining portions of the side members 10 and 12. As also illustrated, the transverse member 14 may conveniently be in the form of a rectangular metallic strip.

The elongated rectangular transverse member 14 supports the side members 10 and 12 in a spaced, parallel relationship to define a rigid structure which is open at the front end remote from the transverse member 14.

A first pallet supporting flange 20 is formed on the inner side of the first side member 10 in essentially uniplanar relationship with the bottom surface of that member, and the flange 20 extends along the length of the side member 10. In like manner, a second pallet supporting flange member 22 is formed on the inner side of the second side member in essentially uniplanar relationship with the bottom surface thereof, and the flange member 22 extends along the length of the side member 12.

A first pair of wheels 24 and 26 are mounted at the front of the structure in appropriate supporting brackets, the brackets being supported in the side members 10 and 12 at the respective ends thereof, and the brackets being designated as 28 and 30. The wheel 24 is rotatably mounted on a shaft 32 for rotation about an axis which is fixed relative to the dolly and which is perpendicular to the longitudinal axes of the side members 10 and 12. Likewise, the wheel 26 is mounted on a shaft 34 which may be rotatable about the same axis of rotation as the wheel 24. The axis of rotation of the wheels 24 and 26 is displaced from the bottom surfaces of the side members 10 and 12 and towards the top surfaces of these members. It will be appreciated that the plane in which the flanges 20 and 22 are situated lies below the axis of rotation of the wheels 24 and 26.

A second pair of wheels 36 and 38 are swivelly mounted on the transverse member 14 to swivel about respective vertical axes. The wheel 36 is mounted in a swivel bracket 40 adjacent the rear end of the side member 10. Likewise, the wheel 36 is mounted in a swivel bracket 42 adjacent the rear end of the side member 12. The swivel bracket 40 supports a shaft 44 on which the wheel 36 is rotatably mounted. The axis of rotation of the wheel 36, like the axis of rotation of the wheels 24 and 26, is higher than the plane of the pallet supporting flanges 20 and 22. Likewise, the wheel 38 is rotatably mounted on a shaft 46 which is supported by the bracket 42. The axis of rotation of the wheel 38 is also displaced up from the plane of the pallet-supporting flanges 20 and 22.

A load guard 50 is mounted in an upright position on the transverse member 14. The load guard 50 may comprise a pair of outer upright bars 52 and 54, which are secured to the member 14 at their lower ends by means of a pair of brackets 56 and 58 and by appropriate screws such as the screws 60 and 62. A cross bar 64 may be welded to the lower ends of the upright bars 52, and a cross strip 66 may be welded to their upper ends, so that the load guard has an essentially rectangular configuration. A plurality of spaced upright strips 68 may then be welded between the cross bar 64 and the strip 66 to complete the load guard.

A U-shaped bar 70 has its ends welded to the upper ends of the upright bars 52 and 54, and the bar 70 forms a convenient push bar for the dolly of the invention.

A first elongated hitch member 72 is pivotally mounted to a transverse strip member 74 by means of a coupling 76. The transverse strip member 74 is also welded to the ends of the side members 10 and 12 and extends in an upright plane perpendicular to the plane of the member 14. The transverse member 74 may be welded to the member 14, and it assists the member 14 in holding the side members 10 and 12 in a rigid structure.

The coupling 76 may be welded to the transverse member 74. The coupling supports the elongated hitch 72 for pivotal motion about a first shaft 78 which extends along a horizontal axis, and for pivotal movement about a second shaft 80 which extends essentially along a vertical axis when the hitch member 72 is moved down into a coupling relationship, as shown by the dotted lines in Figure 1.

A transverse elongated hitch member 82 is affixed to the extremity of the first hitch member 72, for example, by welding. The transverse elongated hitch member 82 is secured to the end of the hitch member 72 at its midpoint, and a pair of inclined supporting strips 84 and 86 may be welded to the hitch members 72 and 82 to hold the transverse hitch member 82 securely in position. A first stud 88 is supported at one end of the transverse hitch member 82 and extends outwardly from the transverse hitch member. A second stud 90 is supported at the other end of the hitch member 82 and extends out from the hitch member 82 in axial alignment with the stud 88.

The side member 12 has a hitch receptacle 90 affixed to its forward extremity, as by welding. A similar hitch receptacle 92 (hidden) is welded to the front end of the side member 10. The receptacles 90 and 92 have a hooked-shaped configuration, and are adapted to receive the studs similar to the studs 88 and 90, of a hitch similar to the hitch described above and which is designated generally as 94. The hitch 116 may be pivotally mounted, in the described manner, to the rear end of a dolly similar to the dolly of Figure 1 and which is situated in front of the dolly of Figure 1 in a dolly train.

A chain clasp 95 is provided to support the hitch 72, 82 in an upright position against the load guard 50, when the hitch is not in use.

A typical warehouse pallet 100 (Figure 3) may be supported on the flanges 20 and 22. The pallet 100, as described above, is a standard item and it is usually composed of wooden slats which are formed into two spaced faces. The lower face of the pallet 100 rests on the supporting flanges 20 and 22, so that it is actually supported by the dolly of the invention relatively close to the floor of the warehouse, and below the axis of rotation of the wheels of the dolly. As described in detail above, this underslung support for the pallet 100 allows it to carry a greater load without exceeding the safe load height, as compared with the loads that may be carried by such pallets supported on the prior art type of dollies. As also mentioned, the underslung support of the pallet 100 in close proximity with the floor of the warehouse permits a typical hand truck, such as the hand truck 102 in Figure 5, to be used for unloading the pallets from the dolly of the invention through its open front end.

The hand truck 102 may be constructed in any known manner. The illustrated truck includes a rear swivelly mounted wheel 104, and it also includes a pair of forks 106 (see also Figure 4). Each of the forks 106 has a pair of wheels 108 mounted near its forward end. The forks 106 are adapted to be inserted between the faces of the pallet 100, until the wheels 108 fall through an opening which is formed in the bottom face of the pallet by omitting one of the transverse boards in the bottom face. Then, the handle 110 of the hand truck may be actuated to lift the pallet 100 up and off the dolly.

The hand truck 102 is illustrated, and has been described above, merely as illustrative of a typical low capacity convenient and inexpensive hand truck that may be used in conjunction with the dolly of the present invention to unload the pallet from it. As illustrated in Figure 4, for example, the forks of the hand truck may be inserted into the pallet through the open front end of the leading dolly constructed in accordance with the invention. Then, by the manipulation of the handle 110, the pallet can quickly be removed from the dolly and loaded into the vehicle which is to carry it to its final destination.

As described previously, the improved construction of the present invention whereby the pallets 100 are carried in an underslung manner in close proximity to the floor of the warehouse permits the use of the convenient hand trucks, of the type represented by the hand truck 102. This is a distinct advantage over the prior art type of dollies, with which pallet hand trucks cannot conveniently be used, and which normally require the use of the more expensive heavy duty fork lift trucks to remove their pallets. This, as mentioned previously, not only requires more expensive handling equipment, but results in relatively slower handling operations.

Figure 4 illustrates a train of three dollies, designated 110, 112 and 114 which are hitched together in accordance with the concepts of the present invention. Each of the dollies 110, 112 and 114 are constructed in accordance with the constructional details of the dolly illustrated in Figures 1-3.

The dolly 110 has a hitch 116 pivotally mounted at its rear end in the manner described above. This hitch in turn engages appropriate hitch receptacles at the front end of the dolly 112. The dolly 112, in turn, has a hitch 118 at its rear end, and the hitch 118 engages receptacles at the front end of the dolly 114. Then, when the dolly train is towed in the direction of the arrow in Figure 4, the combination of the pivoted hitches, with the swivelly mounted wheels at the rear ends of the respective dollies and the fixedly mounted wheels at the front ends causes the train to negotiate sharp turns in the manner described above.

The described hitching arrangement is such that when a sharp turn is negotiated, the dollies trail one directly behind the other, rather than progressively crowding the inside corner. For example, when the first dolly 110 begins to turn, its hitch 116 pivots on its vertical pivot shaft and swings out causing the swivelly mounted wheels on the rear of the following dolly 112 to swivel so that the dolly 112 negotiates the turn in approximately the same track as the dolly 110. In like manner, the dolly 114 is caused by the hitch 118 to negotiate the turn on approximately the same track as the dolly 112.

This feature of sharp negotiation of turns by a train of dollies constructed in accordance with the concepts of the present invention is most advantageous in that it permits narrower warehouse aisles, as noted above, with more space available in the warehouse for merchandise.

The invention provides, therefore, a new and improved dolly for use in warehouses or the like. The new and improved dolly of the present invention not only permits greater loads to be carried without exceeding a safe load height, but it permits the pallets carrying the loads to be unloaded by simple hand trucks, in the described manner. In addition, the improved dolly of the present invention incorporates a hitch mechanism which enables the dolly to be included in a train which is capable of negotiating sharp corners in an improved manner as described above.

While a preferred embodiment of the invention has been described, modifications may be made and it is intended in the following claims to cover all such modifications as fall within the true spirit and scope of the invention.

What is claimed is:

1. A wheeled dolly truck for use in a warehouse and the like, for transporting warehouse pallets, said dolly truck including: a first elongated side member having a top and a bottom and a particular heighth, a second elongated side member having a top and a bottom and a particular heighth, an elongated transverse member affixed to said first side member and to said second side member and extending between said side members at the rear end of said dolly truck, said transverse member supporting said side members in spaced and parallel relationship to define a rigid structure open at the front end of said dolly truck so as to enable said dolly truck to receive a pallet to be transported thereby, a first flange secured to said first side member adjacent the bottom thereof and extending along the length thereof, said first flange extending inwardly towards said second side member substantially at right angles to said first side member to support one side of the pallet to be transported by said dolly truck, a second flange secured to said second side member adjacent the bottom thereof and extending along the length thereof, said second flange extending inwardly towards said first side member substantially at right angles to said second side member to support the other side of the pallet to be transported by said dolly truck, a first wheel rotatably mounted at the front end of said first side member for rotation about a fixed axis of rotation displaced upwardly from said first and second flanges, a second wheel rotatably mounted at the front end of said second side member for rotation about a fixed axis of rotation displaced upwardly from said first and second flanges, at least one further wheel swively mounted at the rear end of said dolly truck for rotation about an axis displaced upwardly from said first and second flanges, an elongated hitch member coupled at one end to said transverse member at the rear end of said dolly truck for pivotal movement with respect to said transverse member about a horizontal axis and a vertical axis, a transverse hitch member affixed to the other end of said elongated hitch member at an intermediate point on said transverse hitch member, and first and second hitch receptacles respectively mounted on said first and second side members at the front end of said wheeled dolly truck to receive the extremities of the transverse hitch member of a similar wheeled dolly truck.

2. A wheeled dolly truck for use in a warehouse and the like, for transporting warehouse pallets, said dolly truck including: a first elongated side member having a top and a bottom and a particular heighth, a second elongated side member having a top and a bottom and a particular heighth, an elongated transverse member affixed to said first side member and to said second side member and extending between said side members at the rear end of said dolly truck, said transverse member supporting said side members in spaced and parallel relationship to define a rigid structure open at the front end of said dolly truck so as to enable said dolly truck to receive a pallet to be transported thereby, a first flange member secured to said first side member at the bottom thereof and extending along the length thereof and inwardly towards said second side member at right angles to said first side member to support one side of the pallet to be transported by said dolly truck, a second flange member secured to said second side member at the bottom thereof and extending along the length thereof and inwardly towards said first side member at right angles to said second side member and in uniplanar relationship with said first flange member to support the other side of the pallet to be transported by said dolly truck, a first wheel rotatably mounted at the front end of said first side member for rotation about a fixed axis of rotation displaced upwardly from the plane of said first and second flanges, a second wheel rotatably mounted at the front end of said second side member for rotation about a fixed axis of rotation displaced upwardly from the plane of said first and second flanges, a third wheel swively mounted on said transverse member adjacent said first side member at the rear end of said dolly truck for rotation about an axis displaced upwardly from the plane of said first and second flanges, a fourth wheel swively mounted on said transverse member adjacent said second side member at the rear end of said dolly truck for rotation about an axis displaced upwardly from the plane of said first and second flanges, an elongated hitch member coupled at one end to said transverse member at the rear end of said dolly truck for pivotal movement with respect to said transverse member about a horizontal axis and a vertical axis, a transverse hitch member affixed to the other end of said elongated hitch member at an intermediate point on said transverse hitch member, and first and second hitch receptacles respectively mounted on said first and second side members at the front end of said wheeled dolly truck to receive the extemities of the transverse hitch member of a similar wheeled dolly truck.

References Cited in the file of this patent

UNITED STATES PATENTS

| 1,129,776 | Anthony | Feb. 23, 1915 |
| 1,745,258 | Hallowell | Jan. 28, 1930 |
| 2,038,697 | Winslow | Apr. 28, 1936 |
| 2,178,647 | Raymond et al. | Nov. 7, 1939 |
| 2,467,500 | Salter | Apr. 19, 1949 |
| 2,575,968 | McCallum et al. | Nov. 20, 1951 |
| 2,610,750 | Hulbert | Sept. 16, 1952 |
| 2,808,157 | Terrill | Oct. 1, 1957 |
| 2,813,727 | Whalen | Nov. 19, 1957 |
| 2,865,648 | Arnot | Dec. 23, 1958 |

FOREIGN PATENTS

| 121,810 | Great Britain | Jan. 2, 1919 |